US008769261B2

(12) United States Patent
Falk et al.

(10) Patent No.: US 8,769,261 B2
(45) Date of Patent: Jul. 1, 2014

(54) SUBSCRIBER-SPECIFIC ENFORCEMENT OF PROXY-MOBILE-IP (PMIP) INSTEAD OF CLIENT-MOBILE-IP (CMIP)

(75) Inventors: Rainer Falk, Eching (DE); Christian Günther, Neubiberg (DE); Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 1159 days.

(21) Appl. No.: 12/084,557

(22) PCT Filed: Oct. 31, 2006

(86) PCT No.: PCT/EP2006/067965
§ 371 (c)(1),
(2), (4) Date: Sep. 1, 2009

(87) PCT Pub. No.: WO2007/051793
PCT Pub. Date: May 10, 2007

(65) Prior Publication Data
US 2010/0011426 A1    Jan. 14, 2010

(30) Foreign Application Priority Data
Nov. 4, 2005   (DE) .................... 10 2005 052 715
Mar. 28, 2006   (DE) .................... 10 2006 014 350

(51) Int. Cl.
*H04L 29/06*    (2006.01)
*H04L 9/32*    (2006.01)
*G06F 7/04*    (2006.01)
*G06F 17/00*    (2006.01)
*H04M 1/66*    (2006.01)
*G06F 15/173*    (2006.01)
*G06F 15/16*    (2006.01)

(52) U.S. Cl.
USPC ............ 713/155; 713/161; 713/168; 726/4; 726/12; 726/14; 455/411; 709/224; 709/227; 709/228

(58) Field of Classification Search
USPC ................ 713/155, 161, 168; 726/4, 12, 14; 455/411; 709/224, 227, 228
See application file for complete search history.

(56) References Cited

U.S. PATENT DOCUMENTS

| 7,545,754 | B2 * | 6/2009 | Funato et al. ............ 370/254 |
| 7,876,704 | B1 * | 1/2011 | Bims et al. .............. 370/254 |
| 2003/0208568 | A1 * | 11/2003 | Inoue et al. ............. 709/220 |
| 2004/0139013 | A1 * | 7/2004 | Barbier et al. ............ 705/40 |

(Continued)

OTHER PUBLICATIONS

RFC2002 http:/www.ietf.org/rfc/rfc2002.txt, Oct. 1996.

(Continued)

*Primary Examiner* — Aravind Moorthy
(74) *Attorney, Agent, or Firm* — Staas & Halsey LLP

(57) ABSTRACT

A method provides subscriber-specific activation of network-based mobility management using an authentication server. According to the method, network-based mobility management is enforced, even if the mobile terminal supports terminal-based mobility management. This gives a network provider complete control over mobility management in his network, preventing configuration problems during the configuration of mobile terminals. In the method, after the successful authentication of a subscriber, the authentication server transmits an authentication confirmation message to an authentication client in an access network. The received authentication confirmation message contains an activation attribute for activating network-based mobility management, if the authentication server does not provide a common mobile key for terminal-based mobility management.

16 Claims, 7 Drawing Sheets

(56) References Cited

U.S. PATENT DOCUMENTS

| | | | |
|---|---|---|---|
| 2004/0213260 A1 | 10/2004 | Dommety | |
| 2005/0188219 A1* | 8/2005 | Annic et al. | 713/200 |
| 2006/0182061 A1* | 8/2006 | Naghian | 370/331 |
| 2006/0291417 A1* | 12/2006 | Aust et al. | 370/331 |

OTHER PUBLICATIONS

RFC3775 http:/www.ietf.org/rfc/rfc3775.txt, Jun. 2004.
RFC 2977 http://www.ietf.org/rfc/rfc.txt?number=2977, Oct. 2000.
RFC 3344 http:/www.ietf.org/rfc/rfc3344.txt, Aug. 2002.
RFC 3846—Johannsen, Mobile IPv4 Extension for Carrying Network Access Identifiers, RFC 3486; Johannsen, Mobile IPv4 Extension for Carrying Network Access Identifiers, RFC 3846; Johannsen, Mobile IPv4 Extension for Carrying Network Access Identifiers, RFC 3846.
RFC 3957 http://www.ietf.org/rfc/rfc3775.txt?number=3957, Mar. 2005.
RFC 3776 http://www.ietf.org/rfc/rfc3776.txt?number=3776, Jun. 2004.
RFC 4285 http:/www.ietf.org/rfc/rfc4285.txt, Jan. 2006.
WiMax Forum NWG: "WIMAX End-to-End Network Systems Architecture (Stage 2: Architecture Tenets, Reference Model and Reference Points)" unnapproved version als of Sep. 15, 2005.
cdma2000 Wireless IP Network Standard: Simple IP and Mobile IP Services http://www.3gpp2.org/Public_html/specs/X.S0011-002-C_v2.0_050708.pdf.
Cisco PMIP—Proxy Mobile Internet Protocol Cisco Implementation http://www.cisco.com/.../products_configuration_guide.
Standard IEEE 802.16, 2001.
Madjid Nakhjiri Narayanan Venkitaraman, Motorola Labs: "EAP Based Proxy Mobile IP Key Bootstraping for WiMAX", IETF Standard-Working-Draft, Internet Engineering Task Force, IETF, CH, Jan. 2005.
Madjid Nakhjiri, Motorola Labs Kuntal Chowdhury Starent Networks AVI Lior Bridgewater Systems Kent Leung Cisco Systems, "Radius Mobile IPv4 Extens", IETF Standard-Working-Draft, Internet Engineering task Force, CH, No. 2, Oct. 2005, http://www.ietf.

* cited by examiner

FIG 1
Prior art

Mobility binding table

| Home Address | Care-of-Address | Lifetime (ms) |
|---|---|---|
| 131.192.180.42 | 129.142.23.42 | 100 |
| 213.123.24.140 | 172.23.142.49 | 150 |
| ... | ... | ... |

FIG 2
Prior art

Visitor list

| Home Address | Home Agent Address | Media Address | Lifetime |
|---|---|---|---|
| 131.192.180.42 | 129.142.23.42 | 08-00-46-26-75-6A | 100 |
| 213.123.24.140 | 172.23.142.49 | 00-02-B3-77-43-00 | 150 |
| ... | ... | ... | ... |

FIG 8
| Mobile terminal MS | Activation attribute PMIP-ONLY |
|---|---|
| $MS_1$ | H |
| $MS_2$ | L |
| ⋮ | ⋮ |
| $MS_N$ | L |
FIG 9A
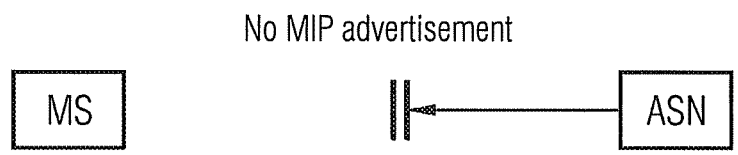
FIG 9B
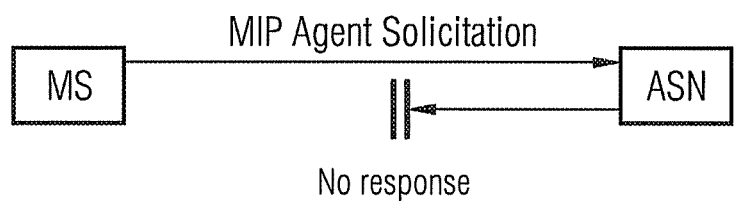

SUBSCRIBER-SPECIFIC ENFORCEMENT OF PROXY-MOBILE-IP (PMIP) INSTEAD OF CLIENT-MOBILE-IP (CMIP)

CROSS REFERENCE TO RELATED APPLICATIONS

This application is based on and hereby claims priority to German Application 10 2005 052 715.9 filed on Nov. 4, 2005, German Application 10 2006 014 350.7, filed on Mar. 28, 2006 and PCT Application No. PCT/EP2006/067965 filed on Oct. 31, 2006, the contents of which are hereby incorporated by reference.

BACKGROUND OF THE INVENTION

The invention relates to a method and an authentication server for subscriber-specific activation of network-based mobility management, in particular with WiMAx networks.

The Internet with TCP/IP protocol provides a platform for the development of higher protocols for the mobile field. As Internet protocols are widespread, a wide range of users may be accessible with corresponding protocol extensions for mobile environments. Conventional Internet protocols were, however, originally not designed for mobile use. In packet switching of the conventional Internet, the packets are exchanged between stationary computers which neither alter their network address nor move between different subnetworks. In radio networks with mobile computers, mobile computers MS are frequently integrated in different networks. The DHCP (Dynamic Host Configuration Protocol) permits the dynamic allocation of an IP address and further configuration parameters to a computer in a network by a corresponding server. A computer which is integrated in a network automatically receives a free IP address allocated by the DHCP protocol. If a mobile computer has DHCP installed, it merely has to come into the range of a local network, which supports the configuration via the DHCP protocol. With the DHCP protocol a dynamic address assignment is possible, i.e. a free IP address is automatically allocated for a specific time. After this period of time has passed, the request either has to be made again by the mobile computer or the IP address may be allocated elsewhere.

With DHCP, a mobile computer may be integrated in a network without manual configuration. As a prerequisite, only a DHCP server has to be available. A mobile computer may thus use services of the local network and, for example, use centrally stored data files. If a mobile computer, however, itself provides services, a potential service user may not find the mobile computer, as the IP address thereof is altered in each network in which the mobile computer is integrated. The same occurs when an IP address is altered during an existing TCP connection. This leads to the termination of the connection. Therefore, in mobile-IP, a mobile computer is allocated an IP address which it also retains in a different network. With conventional IP network change, it is necessary to adapt the IP address settings accordingly. A continuous adaptation of IP and routing configurations to the terminal is, however, almost impossible manually. With conventional automatic configuration mechanisms, the existing connection is interrupted with a change of IP address. The MIP protocol (RFC 2002, RFC 2977, RFC3344, RFC3846, RFC3957, RFC3775, RFC3776, RFC4285) supports the mobility of mobile terminals. With conventional IP protocols, the mobile terminal has to adapt its IP address each time when it changes the IP subnetwork, so that the data packets addressed to the mobile terminal are correctly routed. In order to maintain an existing TCP connection, the mobile terminal has to retain its IP address, as a change of address leads to an interruption of the connection. The MIP protocol removes this conflict, by allowing a mobile terminal and/or a mobile node (MN) to have two IP addresses. The MIP protocol permits a transparent connection between the two addresses, namely a permanent home address and a second temporary care-of-address. The care-of-address is the IP address at which the mobile terminal may be currently reached.

A home agent is a proxy of the mobile terminal, provided that the mobile terminal does not remain in the original home network. The home agent is continuously informed about the current location of the mobile computer. The home agent generally represents a component of a router in the home network of the mobile terminal. When the mobile terminal is located outside the home network, the home agent provides a function so that the mobile terminal is able to register. Then the home agent forwards the data packets addressed to the mobile terminal into the current subnetwork of the mobile terminal.

A foreign agent is located in the subnetwork in which the mobile terminal moves. The foreign agent forwards incoming data packets to the mobile terminal and/or to the mobile computer. The foreign agent is located in a so-called visited network. The foreign agent also generally represents a component of a router. The foreign agent routes all administrative mobile data packets between the mobile terminal and the home agent thereof. The foreign agent unpacks the tunneled IP data packets sent from the home agent and forwards the data thereof to the mobile terminal.

The home address of the mobile terminal is the address at which the mobile terminal may be permanently reached. The home address has the same address prefix as the home agent. The care-of-address is the IP address which uses the mobile terminal in the foreign network.

The home agent maintains a so-called MBT: mobility binding table. The entries in this table are used to assign the two addresses, i.e. the home address and the care-of-address of a mobile terminal to one another and to redirect the data packets accordingly. The MBT table contains entries about the home address, the care-of-address, and information about the period of time in which this assignment is valid (life time). FIG. 1 shows an example of a mobility binding table according to the related art.

The foreign agent (FA) contains a visitor list (VL: Visitor List) which contains information about the mobile terminals which are currently located in the IP network of the foreign agent. FIG. 2 shows an example of such a visitor list according to the related art.

So that a mobile computer may be integrated in a network, firstly it has to find out whether it is located in its home network or a foreign network. Additionally, the mobile terminal has to find out which computer is in the subnetwork of the home agent and/or the foreign agent. This information is communicated by so-called agent discovery.

As a result of the subsequent registration, the mobile terminal is able to communicate its current location to its home agent. To this end, the mobile computer and/or the mobile terminal sends the current care-of-address to the home agent. For registration, the mobile computer sends a registration request to the home agent. The home agent (HA) records the care-of-address in its list and responds with a registration response. In this case, however, there is a security problem. As, in principle, each computer may send a registration request to a home agent, it could be possible in a simple manner to pretend to a home agent that a computer has moved into a different network. Thus a foreign computer could accept all data packets of a mobile computer and/or mobile terminal, without a sender finding out. In order to prevent this, the mobile computer and the home agent use common secret keys. If a mobile computer returns to its home network, it deregisters with the home agent as the mobile computer from now on is itself able to accept all data packets. A mobile radio network must include the following security features. Information is only allowed to be made accessible for desired communication partners, i.e. undesired listeners are not allowed to obtain access to transmitted data. The mobile radio network, therefore, has to have the feature of confidentiality. In addition, authenticity has to be provided. The authenticity permits a communication partner to establish without doubt whether a communication has been actually established with a desired communication partner or whether a third party is pretending to be a communication partner. Authentications may be carried out for each message or for each connection. If authentication is carried out on the basis of connections, the communication partner is identified only once at the start of a session. For the further duration of the session, it is assumed that the following messages also originate from the corresponding sender. Even when the identity of a communication partner is certain, i.e. the communication partner is authenticated, the case may arise that this communication partner is not allowed to access all resources and/or is not allowed to use all services via the network. In this case, a corresponding authorization requires a previous authentication of the communication partner.

With mobile data networks, messages have to cover longer distances via air interfaces and thus may be easily reached by potential attackers. With mobile and wireless data networks, therefore, security aspects play a particular role. Coding technologies represent a substantial way to increase the security in data networks. It is possible by coding to transmit data via insecure communication paths, for example via air interfaces without unauthorized third parties obtaining access to the data. For coding, the data, i.e. the so-called plain text is transformed into ciphertext by a coding algorithm. The coded text may be transported via the insecure data transmission channel and subsequently decoded and/or deciphered.

As very promising wireless access technology, WiMax (Worldwide Interoperability for Microwave Access) is proposed as a new standard, which is used for radio transmission IEEE 802.16. With WiMax, a range of up to 50 km with data rates of over 100 Mbps is intended to be ensured for transmitting stations.

FIG. 3 shows a reference model for a WiMax radio network. A mobile terminal MS is located in the range of an access network (Access Serving Network, ASN). The access serving network ASN is connected via at least one visited network (Visited Connectivity Service Network VCSN) and/or intermediate network to a home network HCSN (Home Connectivity Service Network). The different networks are connected to one another via interfaces and/or reference points R. The home agent HA of the mobile station MS is located in the home network HCSN or in one of the visited networks VCSN.

WiMax supports two variants of mobile IP, so-called client MIP (CMIP), in which the mobile station itself implements the MIP client function, and proxy MIP (PMIP), in which the MIP client function is implemented by the WiMax access network. The functionality provided to this end in the ASN is denoted as Proxy Mobile Node (PMN) or as PMIP client. As a result, MIP may also be used with mobile stations which themselves do not support MIP.

FIG. 4 shows the connection setup in proxy MIP (PMIP) when the home agent is located in the visited network according to the related art.

After establishing a radio connection between the mobile terminal and a base station, initially an access authentication takes place. The function of the authentication, the authorization and the accounting takes place by so-called AAA servers (AAA: authentication authorization and accounting). Between the mobile terminal MS and the AAA-server of the home network (HAAA) authentication messages are exchanged by which the address of the home agent and an authentication key are obtained. The authentication server in the home network contains the profile data of the subscriber. The AAA server obtains an authentication request message, which contains a subscriber identity of the mobile terminal. The AAA server generates after successful access authentication an MSK key (MSK: master session key) for protecting the data transmission paths between the mobile terminal MS and the base station of the access network ASN. This MSK key is transmitted by the AAA server of the home network via the intermediate network CSN to the access network ASN.

After the access authentication, as visible in FIG. 4, the DHCP proxy server is configured in the access serving network ASN. If the IP address and host configuration is already contained in the AAA reply message, the entire information is downloaded into the DHCP proxy server.

After successful authentication and authorization, the mobile station and/or the mobile terminal MS sends a DHCP discovery message and an IP address allocation takes place.

If a mobile terminal is integrated in a network, the mobile terminal may have to be able to find out whether it is located in a home network or in a foreign network. Moreover, the mobile terminal has to find out which computer is in the respective network of the home agent and/or foreign agent. This information is detected by the so-called agent discovery. There are two types of agent discovery, namely so-called agent advertisement and agent solicitation.

With the agent advertisement, the agents, i.e. the home or foreign agents, periodically send broadcast messages to all computers and/or mobile terminals of the subnetwork. Each computer which listens to the broadcast messages in a specific time period, is therefore able to identify the agents in the respective subnetwork.

If a mobile terminal is activated again, it is generally not practical to wait for the next agent advertisement. The mobile terminal has to find out immediately in which subnetwork it is now located. With the so-called agent solicitation, therefore, the mobile terminal sends a request to all computers of the respective subnetwork, to implement an agent advertisement. The mobile terminal is able to insist by agent solicitation that the agents immediately disclose their identity so that the delay is considerably shortened. Agent solicitation is also then implemented, when an agent advertisement fails, for example in the event of packet loss or network change. Using the agent discovery, a mobile terminal may also establish whether it is located in its home network or in a foreign network. Using the packet information within an agent advertisement message, the mobile terminal identifies its home agent. If the mobile terminal receives message packets from a foreign network, it may additionally establish whether its location has altered since the last advertisement. If the mobile terminal receives no advertisement message, the mobile terminal initially assumes that it is located in the home network and the home agent is malfunctioning. The mobile terminal then attempts to make contact with the router of the network, in order to confirm this acceptance. If the mobile terminal is not located in its home network, it then attempts as a result to reach a DHCP server and to obtain an address of the subnetwork. If this is successful, the mobile terminal uses this address as a so-called colocated care-of-address and makes contact with the home agent. The colocated care-of-address is an address assigned to the mobile terminal in the foreign network, which is also transmitted to the home agent.

A differentiation is made between network-based mobility management (PMIP) and terminal-based mobility management (CMIP). With terminal-based mobility management CMIP, the terminal supports mobile-IP (MIP).

FIG. 4 shows the connection setup with conventional network-based mobility management (PMIP) whilst FIG. 5 represents the connection setup with conventional terminal-based mobility management (CMIP).

When establishing a connection between the mobile terminal and the network, the authentication server of the home network (H-AAA) sends an authentication confirmation message (SUCCESS) after successful authentication of the subscriber. The authentication confirmation message communicates to the authentication client that the authentication of the subscriber has been successfully completed. With proxy MIP and/or network-based mobility management (PMIP) the mobile terminal does not support mobile-IP and/or the corresponding MIP software is not activated in the mobile terminal. In contrast, with client MIP (CMIP) and/or with terminal-based mobility management, mobile-IP is supported by the respective terminal and/or the mobile station MS. With proxy MIP the mobile terminal only recognizes one IP address assigned by the DHCP server. The care-of-address of the mobile terminal is not known to the mobile terminal but to the PMIP client, the foreign agent as well as the home agent. In contrast, the mobile terminal with client MIP recognizes its two IP addresses, i.e. both the home address and also the care-of-address.

As is visible in FIGS. 4, 5, after the IP address allocation, MIP registration takes place. During the MIP registration, the home agent is informed about the current location of the mobile terminal. For its registration, the mobile terminal and/or the corresponding PMIP client sends a registration request to a home agent, which contains the current care-of-address. The home agent includes the care-of-address in a list managed thereby and replies with a registration reply. As, in principle, each computer is able to send a registration request to a home agent, it could be easily pretended to a home agent that a computer and/or a mobile terminal had moved into a different network. In order to prevent this, both the mobile terminal and the home agent use a common secret key, namely a so-called MIP key.

With proxy MIP (PMIP), the registration request MIPRRQ is transmitted from a PMIP client within the access network via a foreign agent to the home agent HA. The home agent HA has a key for the subscriber allocated by the associated authentication server H-AAA and transmits said key with the MIP registration reply as shown in FIG. 4.

With terminal-based mobility management (CMIP) the registration request message (MIPRRQ) is directed from the mobile terminal MS via the foreign agent directly to the home agent HA, as shown in FIG. 5.

With terminal-based mobility management (CMIP) a common mobile key has to be generated for the cryptographic protection of mobile signaling messages via the mobile terminal MS and the authentication server of the home network H-AAA, which subsequently protects the communication between the mobile terminal MS and the home agent. With network-based mobility management PMIP a common mobile key has to be generated by an authentication server via the PMIP client and the home agent HA. With a conventional system, network-based mobility management PMIP (Proxy MIP) is only used when the mobile terminal MS does not support terminal-based mobility management CMIP. When the home network of a mobile terminal MS in contrast to the mobile terminal itself provides no support for MIP, problems occur with the MIP configuration of the mobile terminal.

SUMMARY

Therefore it is one possible object to provide a method and an authentication server in which the network operator obtains complete control over the mobility management in its network and configuration problems with the MIP configuration of mobile terminals are avoided.

The inventors propose a method for subscriber-specific activation of network-based mobility management (PMIP), in which an authentication server of a subscriber sends an authentication confirmation message (SUCCESS) to an authentication client in an access network (ASN), after successful authentication of the subscriber, the authentication confirmation message (SUCCESS) containing an activation attribute (PIMP_ONLY) for activating network-based mobility management (PMIP), if the authentication server does not provide a common mobile key for terminal-based mobility management (CMIP).

The fundamental idea of the method proposed by the inventors is to enforce network-based mobility management (PMIP) even when the mobile terminal MS supports terminal-based mobility management (CMIP).

As a result, the operator of a connectivity service network (CSN) obtains complete control over the macro mobility management in its network.

In a preferred embodiment of the method, the authentication server is located in a home network of the subscriber.

In a further preferred embodiment of the method, the authentication server transmits the authentication confirmation message (SUCCESS) to a gateway of the access network, which contains the authentication client.

In a preferred embodiment of the method, the activation attribute (PMIP_ONLY) is formed by a flag which is set by the authentication server.

In a preferred embodiment of the method, the authentication confirmation message (SUCCESS) further comprises an MSK key, a DHCP server address, a home agent address and a billing identifier (CUI).

In a preferred embodiment of the method, the transmitted activation attribute (PMIP_ONLY) is buffered in the gateway of the access network, the respective mobile terminal (MS) of the subscriber being assigned to the respective activation attribute (PMIP_ONLY).

In a preferred embodiment of the method, the authentication client ensures that the foreign agent (FA) in the access network (ASN) does not send advertisement messages to the mobile terminal (MS) of a subscriber, if the associated buffered activation attribute (PMIP_ONLY) is set, in order to deactivate terminal-based mobility management (CMIP) for the respective subscriber.

The foreign agent (FA) preferably does not reply to a solicitation message.

In a preferred embodiment of the method, the activation attribute (PMIP_ONLY) is further set by the authentication server, if a network access identifier (NAI) of the subscriber is not clear.

In a further embodiment of the method, the activation attribute (PMIP_ONLY) is further set by the authentication server if a network access identifier (NAI) of the subscriber indicates that WiMax-specific mobile IP is not supported by the mobile terminal of the subscriber or by the home network of the subscriber.

In a preferred embodiment of the method, the home network is formed by a 3GPP network, a 3GPP2 network, a WLAN network or a WiMax network.

In a preferred embodiment of the method, the access network (ASN) is formed by a WiMax network.

The inventors further propose an authentication server for subscriber-specific activation of network-based mobility management, in which the authentication server sends an authentication confirmation message (SUCCESS) to an authentication client in an access network (ASN), after successful authentication of a subscriber, the authentication confirmation message containing an activation attribute (PMIP_ONLY) for activating network-based mobility management (PMIP), if the authentication server does not provide a common mobile key for terminal-based mobility management (CMIP).

After the completion of the connection setup shown in FIG. 4, the mobile terminal has obtained a home address and is registered with the home agent.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows an example of a mobility binding table according to the related art;

FIG. 2 shows an example of a visitor list according to the related art;

FIG. 8 shows a table which is stored within a gateway for use with the proposed method;

FIGS. 9a, 9b show diagrams for explaining the mode of operation of the proposed method;

DETAILED DESCRIPTION OF THE PREFERRED EMBODIMENT

Figure 3:
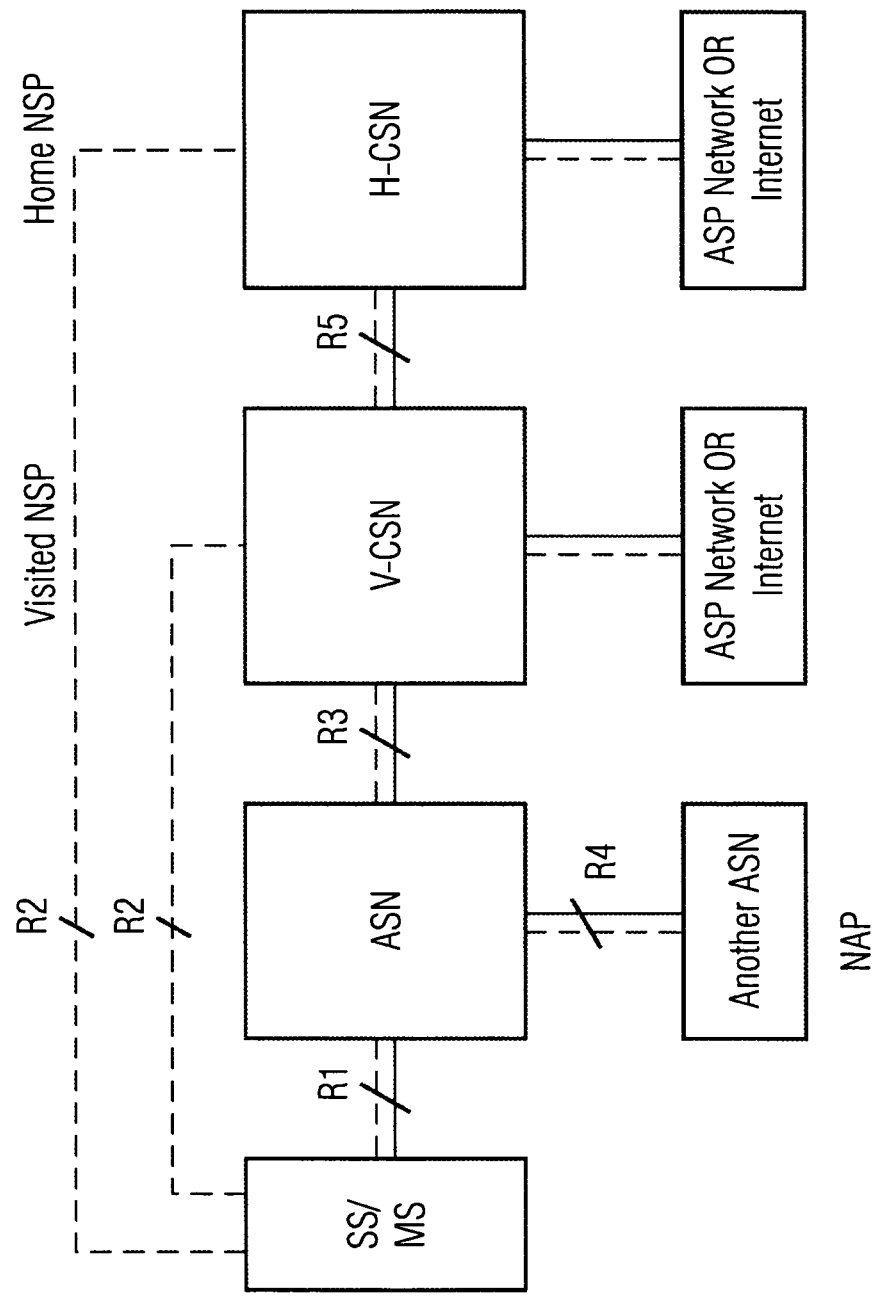
FIG. 3 shows a reference network structure for a WiMax radio network.

Reference will now be made in detail to the preferred embodiments of the present invention, examples of which are illustrated in the accompanying drawings, wherein like reference numerals refer to like elements throughout.

Figure 6:
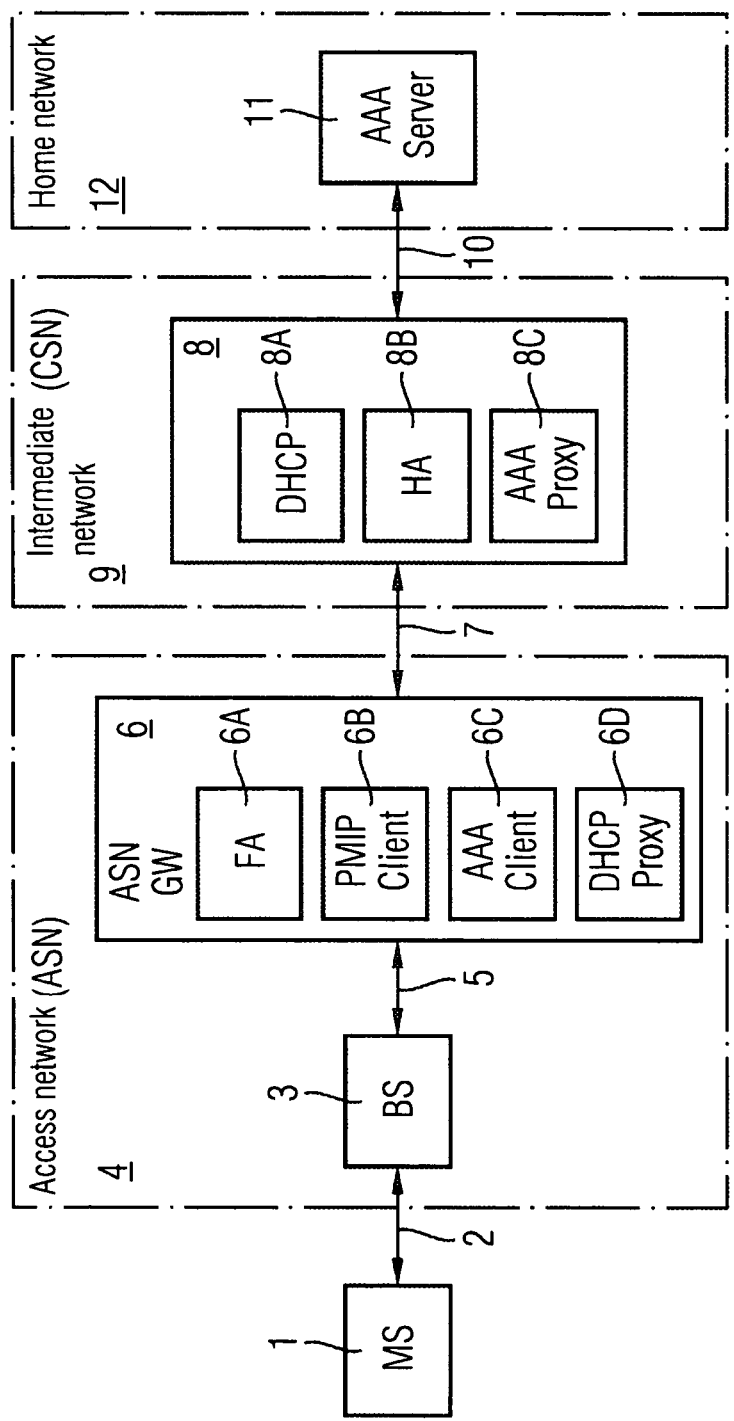
FIG. 6 shows a network structure according to a preferred embodiment of the method proposed by the inventors.

As may be seen from FIG. 6 a mobile terminal 1 may be connected via a wireless interface 2 to a base station 3 of an access network 4. The mobile terminal 1 is any mobile terminal, for example a laptop, a PDA, a mobile telephone, or any other mobile terminal. The base station 3 of the access network 4 is connected via a data transmission line 5 to an access network gateway 6. In the access gateway computer 6, further functionalities are preferably incorporated, in particular a foreign agent 6A, a PMIP client 6B, an AAA client server 6C and a DHCP proxy server 6D. The foreign agent 6A is a router, which provides routing services for the mobile terminal 1. The data packets directed to the mobile terminal 1 are transmitted tunneled and unpacked by the foreign agent 6A.

The gateway 6 of the access network 4 is connected via an interface 7 to a computer 8 of an intermediate network 9. The computer 8 contains a DHCP server 8A, a home agent 8B and an AAA proxy server 8C. The home agent 8B is the proxy of the mobile terminal 1 when said mobile terminal is not located in its original home network. The home agent 8B is continually informed about the current location of the mobile computer 1. Data packets for the mobile terminal 1 are firstly transmitted to the home agent and forwarded tunneled from the home agent to the foreign agent 6A. Conversely, data packets which are transmitted from the mobile terminal 1 are directly sent to the respective communication partner. The data packets of the mobile terminal 1 contain in this case the home address as the sender address. The home address has the same address prefix, i.e. network address and subnetwork address as the home agent 8B. Data packets which are sent to the home address of the mobile terminal 1 are intercepted by the home agent 8B and tunneled from the home agent 8B to the care-of-address of the mobile terminal 1 and finally received at the end point of the tunnel, i.e. received by the foreign agent 6A or the mobile terminal itself.

The computer 8 of the intermediate network 9 is connected via a further interface 10 to an authentication server 11 of a home network 12. The home network is, for example, a 3GPP network for UMTS. In an alternative embodiment, the server 11 is an authentication server of a WLAN network. The authentication server 11 shown in FIG. 5 does not support an MIP registration.

It is desirable from the point of view of the network operator to carry out network-based mobility management (PMIP) continually or subscriber-specifically and during the transmission of the corresponding authentication confirmation message (SUCCESS) to transmit an activation attribute which indicates that network-based mobility management PMIP has to be activated. The activation attribute is preferably a flag which is set by the authentication server 11 in the home network 12 and subsequently is transmitted by the authentication server within the authentication confirmation message to the gateway 6 on the access network 4. The authentication confirmation message (SUCCESS) which is transmitted by the authentication server 11 to the gateway 6, contains in addition to the activation attribute PMIP_ONLY preferably additionally an MSK key, a DHCP server address and a home agent address as well as, for example, a billing identifier (CUI). The activation attribute (PMIP_ONLY) is set subscriber-specifically by the authentication server 11, if the authentication server 11 is not able to provide a common mobile key for terminal-based mobility management CMIP for the respective subscriber.

The activation attribute (PMIP_ONLY) transmitted within the authentication confirmation message is preferably buffered in a router and/or in a gateway 6 of the access network 4. In this case, the respective mobile terminal MS of the subscriber is assigned to the respective activation attribute PMIP_ONLY.

FIG. 8 shows schematically a table in which one respective transmitted activation attribute PMIP_ONLY is assigned in different mobile terminals and/or subscribers. The table shown in FIG. 8 is located within a memory of the router 6. In the example shown in FIG. 8, for example the activation attribute PMIP_ONLY is set (H) for the mobile terminal MS1, whilst the activation attribute PMIP_ONLY is not set (L) for a further mobile terminal MS2.

Furthermore, in an alternative embodiment, the authentication server 11 sets the activation attribute contained in the authentication confirmation message, if a network access identifier NAI of the subscriber received thereby is not clear (for example user@vodafone.com). This may, for example, be established by a roaming agreement between the network operators. In other cases, it is known in the visited network that with some home networks problems occur with MIP support, for example home networks which, in principle, support MIP but not precisely in the form expected by WiMax, so that interoperability problems may occur. Moreover, it may be possible that latency times which are too long or an overload in the communication with the home network occur, for example when these home networks are far apart from one another or when these home networks are not able to provide sufficient free bandwidth for the communication between the visited network and the home network. In all these cases, irrespective of whether a specific home network MIP supports corresponding configuration, by the method the network operator may insist that only network-based mobility management PMIP is used.

In one embodiment of the method, the activation attribute PMIP_ONLY is also set by the authentication server 11 if a network access identifier NAI of the subscriber indicates that a WiMax-specific MIP is not supported by the mobile terminal of the subscriber or by the home network of the subscriber.

The home network 12 shown in FIG. 6 may be a 3GPP network, a 3GPP2 network, a WLAN network or a WiMax network.

Figure 7:
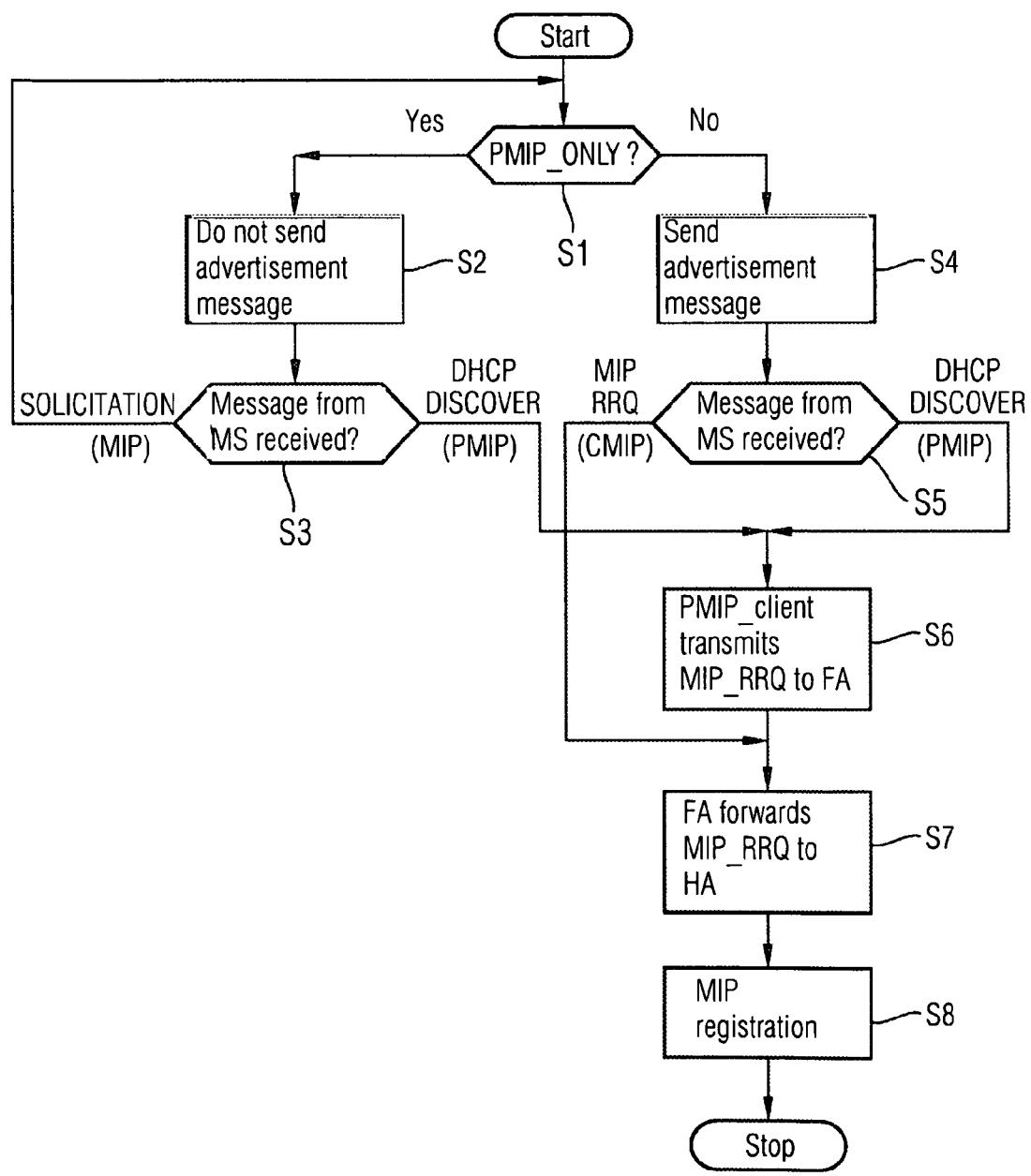
FIG. 7 shows a flow chart explaining the mode of operation of a possible embodiment of the proposed method.

FIG. 7 shows a flow chart for a process operated within the ASN gateway 6. The gateway and/or the router 6 of the access network ASN contains a foreign agent 6A, a PMIP client 6B, an authentication client 6C as well as a DHCP proxy server 6D. The table shown in FIG. 8 is stored in a memory of the gateway. For each mobile terminal MS1, a flag and/or an activation attribute PMIP_ONLY is stored, which indicates whether network-based mobility management PMIP has to be undertaken for the respective subscriber.

In a step S1, the router 6 checks whether or not the activation flag is set for the respective subscriber.

If this is the case, the router 6 does not send an advertisement message via the corresponding base station 3 in step S2. Subsequently the gateway 6 waits to find out whether it receives messages from the corresponding terminal 1 in step S3. If the gateway 6 receives a solicitation message it does not react and the process reverts to step S1. This means a mobile terminal 1 which supports mobile-IP has not received a reply from the access network. As a result, the access network 4 enforces the use of network-based mobility management PMIP.

If in step S1 it is established that the activation attribute PMIP_ONLY is not set for the respective subscriber, the gateway 6 sends an advertisement message to the mobile terminal S4 via the extended radio link and/or the link.

In step S5, the router 6 and/or the gateway 6 checks which message it receives from the mobile terminal 1. If the received message is a DHCP discovery message, PMIP is present and the process is continued with step S6. If the message is a PMIP registration request MIPRRQ, CMIP is present and the process is then continued in step S7. In step S6 the PMIP client 6B transmits a registration request MIPRRQ to the foreign agent 6A.

The foreign agent 6A forwards in step S7 the registration request to the home agent of the subscriber which is in an intermediate network 9 or in the home network 12.

Figure 4:
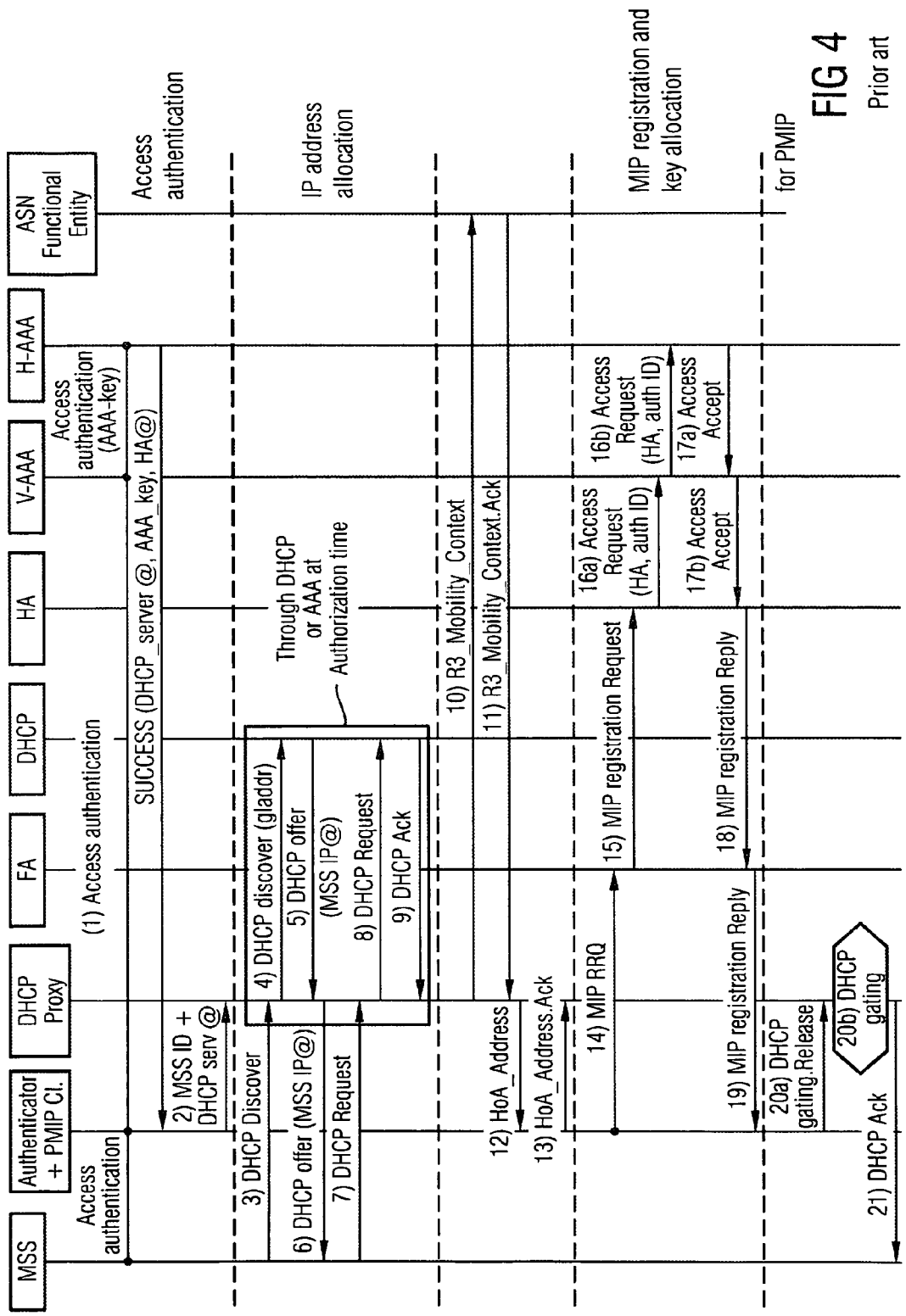
FIG. 4 shows a PMIP connection setup in a conventional network according to the related art.
Figure 5:
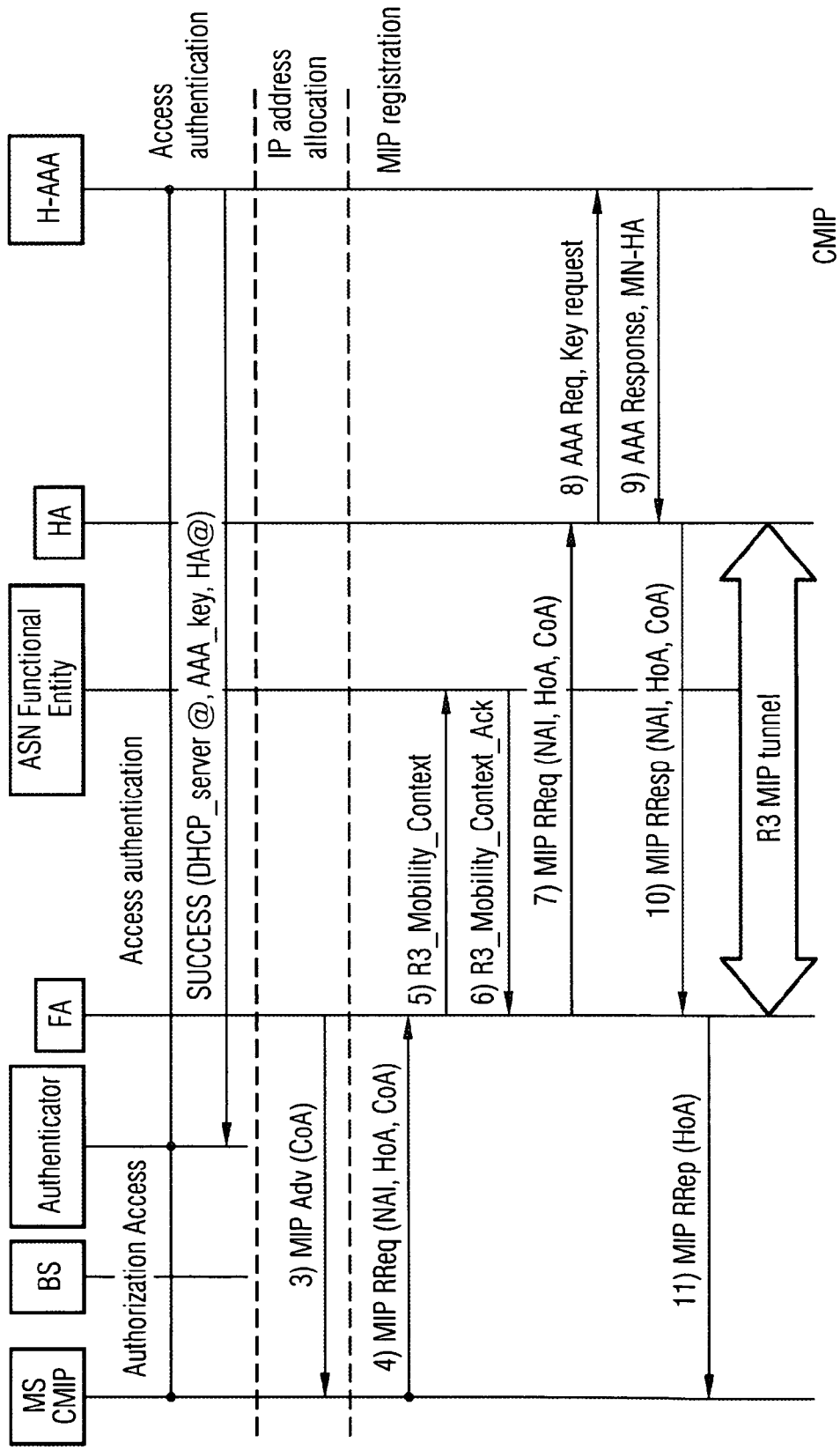
FIG. 5 shows a CMIP connection setup in a conventional network according to the related art.

In step S8, the MIP registration takes place as shown in FIGS. 4, 5.

FIGS. 9A, 9B show schematically the procedure of the method according to the invention.

The ASN gateway 6 does not send advertisement messages to the respective mobile terminal 1, after receiving an activation attribute PMIP_ONLY, as shown in FIG. 9A.

The ASN gateway 6 also does not reply to an MIP agent solicitation message from the mobile terminal 1 when in the table shown in FIG. 8 the corresponding activation attribute PMIP_ONLY is set (H).

The access network 4 thus behaves as regards the mobile terminal 1 and/or the subscriber, as if no foreign agent were present in the access network 4.

The reaction of the gateway 6 is subscriber-specific. For example, the CMIP functionality is refused and/or blocked only to subscribers whose home network provides no mobile-IP support, whilst CMIP support is offered to other subscribers who use the same access network 4.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method of subscriber-specific activation of network-based mobility management, comprising:
    preparing an authentication confirmation message, which contains an activation attribute when determining an authentication server of a subscriber does not provide a common mobility key for terminal-based mobility management, the activation attribute indicating that activation of network-based mobility management is required for a mobile terminal of the subscriber that supports terminal-based mobility management; and
    sending the authentication confirmation message to an authentication client in an access network, the authentication confirmation message being sent by the authentication server after successful authentication of the subscriber of the mobile terminal, and
    wherein with the terminal-based mobility management the mobile terminal supports Mobile-IP, and with the network-based mobility management the access network implements a Mobile-IP client function, and
    wherein receipt of an advertisement message at the mobile terminal enables terminal-based mobility management, and
    the authentication client ensures that a foreign agent in the access network does not send the advertisement message to the mobile terminal when determining the authentication confirmation message contains the activation attribute that is set in association with the mobile terminal, thereby deactivating the terminal-based mobility management for the subscriber.

2. The method as claimed in claim 1, wherein the authentication server is located in a home network of the subscriber or is formed by an authentication proxy server which is located in an intermediate network.

3. The method as claimed in claim 2, wherein the activation attribute is a flag which is set by the authentication server.

4. The method as claimed in claim 2, wherein the home network is a 3GPP network, a 3GPP2network, a WLAN network or a WiMax network.

5. The method as claimed in claim 1, wherein
    the authentication server transmits the authentication confirmation message to a gateway of the access network, and
    the access network contains the authentication client.

6. The method as claimed in claim 1, wherein the authentication confirmation message further comprises an MSK key, a DHCP server address, a home agent address and a billing identifier.

7. The method as claimed in claim 1, wherein
the activation attribute is buffered in a gateway of the access network after being sent,
the subscriber is a mobile terminal, and
the mobile terminal is assigned to the activation attribute.

8. The method as claimed in claim 7, wherein
the mobile terminal sends an agent solicitation message, a response to which deactivates terminal-based mobility management, and
the authentication client ensuring that a foreign agent in the access network does not reply to the agent solicitation message of the mobile terminal if the authentication confirmation message contains the activation attribute.

9. The method as claimed in claim 1, wherein
the authentication confirmation message contains the activation attribute if the activation attribute has been set by the authentication server, and
the authentication server sets the activation attribute:
if the authentication server does not provide a common mobile key for terminal-based mobility management, or
if a network access identifier of the subscriber is not clear.

10. The method as claimed in claim 1, wherein
the authentication confirmation message contains the activation attribute if the activation attribute has been set by the authentication server, and
the authentication server sets the activation attribute:
if the authentication server does not provide a common mobile key for terminal-based mobility management, or
if a network access identifier of the subscriber indicates that a WiMax-specific MIP is not supported by a mobile terminal of the subscriber or by a home network of the subscriber.

11. The method as claimed in claim 1, wherein the access network is a WiMax network.

12. An authentication server for a subscriber-specific activation of network-based mobility management, comprising:
a preparation unit to prepare an authentication confirmation message, which contains an activation attribute when determining the authentication server does not provide a common mobile key for terminal-based mobility management, the activation attribute indicating that activation of network-based mobility management is required for a mobile terminal of the subscriber that supports terminal-based mobility management; and
a transmission unit to send the authentication confirmation message to an authentication client in an access network of the subscriber, after successful authentication of the subscriber of the mobile terminal, and
wherein with the terminal-based mobility management the mobile terminal supports Mobile-IP, and with the network-based mobility management the access network implements a Mobile-IP client function, and
wherein receipt of an advertisement message at the mobile terminal enables terminal-based mobility management, and
the authentication client ensures that a foreign agent in the access network does not send the advertisement message to the mobile terminal when determining the authentication confirmation message contains the activation attribute that is set in association with the mobile terminal, thereby deactivating the terminal-based mobility management for the subscriber.

13. The authentication server as claimed in claim 12, wherein the authentication server is provided in a home network of the subscriber or is formed by an authentication proxy server which is located in an intermediate network.

14. The authentication server as claimed in claim 13, wherein the home network is a 3GPP network, a 3GPP2 network, a WLAN network or a WiMax network.

15. The authentication server as claimed in claim 12, wherein the access network is a WiMax network.

16. A method for subscriber-specific activation of network-based mobility management, comprising:
preparing an authentication confirmation message, which contains an activation attribute when determining an authentication server of a subscriber does not provide a common mobility key for terminal-based mobility management, the activation attribute indicating that activation of network-based mobility management is required for a mobile terminal of the subscriber that supports terminal-based mobility management; and
sending the authentication confirmation message to an authentication client in an access network, the authentication confirmation message being sent by the authentication server of the subscriber after successful authentication of the subscriber of the mobile terminal, and
wherein with the terminal-based mobility management the mobile terminal supports Mobile-IP, and with the network-based mobility management the access network implements a Mobile-IP client function, and
wherein receipt of an advertisement message at the mobile terminal enables terminal-based mobility management, and
the authentication client ensures that a foreign agent in the access network does not send the advertisement message to the mobile terminal when determining the authentication confirmation message contains the activation attribute that is set in association with the mobile terminal, thereby deactivating the terminal-based mobility management for the subscriber.

* * * * *